US012628843B2

(12) United States Patent
Sato et al.

(10) Patent No.: US 12,628,843 B2
(45) Date of Patent: May 19, 2026

(54) METHOD FOR PRODUCING CHEESE-LIKE SNACK FOOD

(71) Applicant: FUJI OIL CO., LTD., Osaka (JP)

(72) Inventors: Tomonori Sato, Ibaraki (JP); Hiroko Yonemoto, Ibaraki (JP); Kenichi Furutani, Osaka (JP)

(73) Assignee: FUJI OIL CO., LTD., Osaka (JP)

( * ) Notice: Subject to any disclaimer, the term of this patent is extended or adjusted under 35 U.S.C. 154(b) by 355 days.

(21) Appl. No.: 18/276,635

(22) PCT Filed: Mar. 3, 2022

(86) PCT No.: PCT/JP2022/009104
§ 371 (c)(1),
(2) Date: Aug. 9, 2023

(87) PCT Pub. No.: WO2022/202186
PCT Pub. Date: Sep. 29, 2022

(65) Prior Publication Data
US 2024/0306656 A1 Sep. 19, 2024

(30) Foreign Application Priority Data
Mar. 23, 2021 (JP) ................................. 2021-048046

(51) Int. Cl.
A23L 11/50 (2021.01)
A23B 2/92 (2025.01)
A23C 20/02 (2021.01)
(52) U.S. Cl.
CPC .............. A23C 20/025 (2013.01); A23B 2/92
(2025.01); A23L 11/50 (2021.01); A23V
2400/123 (2023.08)

(58) Field of Classification Search
CPC ......... A23C 20/025; A23L 11/50; A23B 2/92;
A23V 2400/123
USPC .......................................................... 426/46
See application file for complete search history.

(56) References Cited

FOREIGN PATENT DOCUMENTS

| | | | | |
|---|---|---|---|---|
| CN | 107865117 A | * | 4/2018 | ........... A23C 20/025 |
| JP | H03262441 | | 11/1991 | |
| JP | H05184321 | | 7/1993 | |
| JP | H11276070 | | 10/1999 | |
| JP | 2003189813 | | 7/2003 | |
| JP | 2014233270 | | 12/2014 | |
| JP | 2015142561 | | 8/2015 | |
| WO | 2018173610 | | 9/2018 | |

OTHER PUBLICATIONS

Translation of CN-107865117-A (Year: 2018).*
"International Search Report (Form PCT/ISA/210) of PCT/JP2022/009104", mailed on May 10, 2022, with English translation thereof, pp. 1-4.

* cited by examiner

Primary Examiner — Brent T O'Hern
(74) Attorney, Agent, or Firm — JCIPRNET

(57) ABSTRACT

Provided is a cheese-like snack food that is capable of maintaining flavor for several weeks even in a state where a package is opened and has improved storage stability. The cheese-like snack food having improved storage stability can be provided by freeze-drying a soymilk preparation prepared by using soymilk as a raw material, adding an oil and fat, and starch to the soymilk, and adjusting pH to 6 or less.

6 Claims, No Drawings

METHOD FOR PRODUCING CHEESE-LIKE SNACK FOOD

CROSS-REFERENCE TO RELATED APPLICATION

This application is a 371 application of the International PCT application serial no. PCT/JP2022/009104, filed on Mar. 3, 2022, which claims the priority benefit of Japan application JP2021-048046, filed on Mar. 23, 2021. The entirety of each of the above-mentioned patent application is hereby incorporated by reference herein and made a part of this specification.

TECHNICAL FIELD

The present invention relates to a cheese-like snack food produced from soymilk.

BACKGROUND ART

There is research in drying cheese for consuming the dried cheese as a snack. Cheese snacks produced by heating and drying a raw material having an adjusted αS-casein ratio (Patent Document 1), and snack-type dry cheese produced by freeze-drying in a special environment (Patent Document 2) have been proposed.

A soybean is a food material which has been used for a long time, and tofu is a typical processed food thereof. A freeze-dried product of tofu is also known, and a freeze-dried tofu having good restorability, that is, good reconstitution with hot water has been proposed (Patent Document 3).

CITATION LIST

Patent Literature

Patent Document 1: JP H11-276070 A
Patent Document 2: JP 2015-142561 A
Patent Document 3: JP H05-184321 A

SUMMARY OF INVENTION

Technical Problem

Many cheese snacks are sold as pet food because of their rapid deterioration of flavor. Accordingly, an object of the present invention is to improve a storage stability of freeze-dried cheese snacks and processed foods having equivalent flavor and texture. Specifically, it is an object to maintain the flavor for at least several weeks even in an environment where a package is open.

Solution to Problem

As a result of intensive studies on the problems described above, the present inventors have found that, instead of cheese using milk, when soymilk having a water content adjusted by adding an oil and fat and starch is used as a raw material and is freeze-dried, a food having cheese snack-like flavor and texture and excellent storage stability can be produced. And thus the present inventors have completed the present invention.

That is, the present invention relates to the following.

(1) A method for producing a cheese-like snack food, the method including freeze-drying a soymilk preparation prepared by adding an oil and fat, and starch to soymilk, the soymilk preparation having a pH of 6 or lower.

(2) The production method according to (1), wherein the soymilk preparation has a water content of 20 wt. % or greater and 50 wt. % or less.

(3) The production method according to (1), wherein the soymilk preparation has an oil content of 15 wt. % or greater and 45 wt. % or less.

(4) The production method according to (1), wherein the soymilk preparation has a starch content of 15 wt. % or greater and 40 wt. % or less.

(5) The production method according to (1), wherein the soymilk is low-oil-content soymilk having an oil content of 2 wt. % or less.

(6) The production method according to (4), wherein the soymilk is low-oil-content soymilk having an oil content of 2 wt. % or less.

(7) The production method according to (1), wherein the pH is adjusted by fermentation.

(8) The production method according to (4), wherein the pH is adjusted by fermentation.

Advantageous Effects of Invention

According to the present invention, it is possible to obtain a cheese snack-like processed food having excellent storage stability.

DESCRIPTION OF EMBODIMENTS

Soymilk

Soymilk used in the present invention is produced by using soybeans or defatted soybeans as a raw material, subjecting the raw material to pretreatment as needed, and then adding water to extract water-soluble components. The pretreatment is an operation carried out on soybeans before water extraction, and examples thereof include dry heating, wet heating, dehulling, degerming, depressing, crushing, classifying, and degreasing.

The soybeans are subjected to one or more types of the pretreatment or to no pretreatment to extract the water-soluble components. Any condition can be adopted in extraction, but it is preferable that it results in extraction of a half or more of soybean globulin contained in the soybeans. An amount, a temperature, pH, and the like of the extraction water can be set to any value, and the extraction can be performed not only once but also a plurality of times under the same conditions or different conditions. In addition, wet crushing can be performed after adding water. Soymilk, which is the resulting extract, is separated from insoluble components such as soybean curd refuse and recovered. The soymilk after separation can be concentrated by various methods such as concentration under reduced pressure.

Note that the soymilk used in the present invention is preferably low-fat soymilk which is considered to be rich in "umami" and the like. The low-fat soymilk is soymilk having an oil content of 2 wt. % or less, preferably 1 wt. % or less.

Oil and Fat

In the present invention, it is essential to add an oil and fat to soymilk. A type and an addition amount of the oil and fat used here vary depending on the pretreatment of soybeans and the extraction condition, but the added amount is preferably 15 to 45 wt. %, and more preferably 20 to 40 wt. % in a soymilk preparation described below. When the added amount does not fall within the range, snack-like texture may not be obtained.

The oil and fat added is preferably a solid fat, that is, an oil and fat capable of maintaining a solid form at room temperature in terms of texture, and examples thereof include a coconut oil, a palm kernel oil, a palm oil, a cacao butter, fractionated oils thereof, and various hydrogenated oils.

Starch

In the present invention, it is also essential to add starch to soymilk. Starch suppresses denaturation at the time of freezing to greatly affect the texture after drying. Starch also functions as a body material, and the addition of starch can save the trouble of putting the soymilk in a mold or the like for cooling at the time of freezing. Legume starch is preferred for the present usage. The added amount can be appropriately determined, but is preferably 15 to 40 wt. %, and more preferably 20 to 30 wt. % in the soymilk preparation described below. When the added amount is too small or too large, the texture may be adversely affected.

pH

In the present invention. pH adjustment of the soymilk is also essential. When the pH is high, the flavor is not preferable and the texture is also affected. The pH is 6 or lower, and the pH is preferably 5.5 or lower. The pH is preferably 3 or higher, and the pH is more preferably 4 or higher because a low pH results in strong sourness. The pH adjustment can be carried out by fermentation with microorganisms or addition of an acid, but fermentation can impart more flavor and thus fermentation is preferred. In a case of fermentation, lactic acid bacteria are preferably used, and for example, fermentation is carried out by using a *Lactobacillus* starter at 15 to 45° C. to the extent of pH of about 4.0 to 5.5.

In a case of adding an acid, examples of the acid include organic acids such as lactic acid, citric acid, malic acid, and acetic acid, and inorganic acids such as phosphoric acid and hydrochloric acid. It is preferable to use an organic acid and most preferable to use lactic acid.

Additional Raw Material

Raw materials besides those described above may be added to the product of the present invention. Examples thereof include various salts, saccharides, oligosaccharides, dextrin, other seasonings, and flavors.

Water Content

It is important that the soymilk used in the present invention has a water concentration of 20 to 50 wt. % in the soymilk by the concentration operation and the addition of the oil and fat, starch, and the like described above. When the water content is low, it is difficult to perform various processes for the soymilk, and when the water content is high, it is difficult to obtain snack-like physical properties.

Soymilk Preparation

A shearing force is applied to the soymilk to which the oil and fat, the starch, and other raw materials are added, and thus homogenization treatment is performed. For the homogenization, an emulsifying apparatus such as a homomixer, a high-pressure homogenizer, or an ultrasonic homogenizer can be used. An emulsion having a finer particle size can be prepared by dispersing the oil and fat with a homomixer or the like and then performing homogenization with a high-pressure homogenizer.

To prepare a stable emulsion, an emulsifier may be added. Examples of the emulsifier include a natural emulsifier such as lecithin and enzyme-treated lecithin, and a synthetic emulsifier such as a sucrose fatty acid ester, a propylene glycol fatty acid ester, a glycerin fatty acid ester, a polyglycerin fatty acid ester, a polyglycerin condensed ricinoleic acid ester, and a polyoxyethylene sorbitan fatty acid ester.

In addition, when heat sterilization is performed after the homogenization treatment, a food having high safety can be obtained. The heating can be performed at 80° C. to 130° C. for about 30 minutes to 5 seconds.

Note that in a case of performing the pH adjustment by fermentation as described above, it is preferable to carry out fermentation after homogenization and heat sterilization. After fermentation, heat sterilization can be carried out again as needed.

The soymilk thus treated was used as a soymilk preparation.

Freeze-Drying

The soymilk preparation is freeze-dried to obtain a snack food. In this case, the soymilk preparation is provided for consumption as a snack-like food after drying, and thus, it is preferable to freeze the soymilk preparation after being formed into an easily edible shape. Various shapes such as a cubic shape, a rectangular parallelepiped shape, and a spherical shape can be adopted. However, in any of these shapes, it is preferable to perform freezing in an order of about 0.1 to 10 ml, and more preferably in a unit of 0.5 to 3 ml. For a size in this case, it is preferable that each of three vertical sides is 5 mm or larger. When the size is small, it is difficult to consume, and when the size is large, it takes a long time for freeze-drying.

Upon freezing, a solid or semi-solid soymilk preparation may be cut or shaped into an appropriate size and subsequently frozen, or a semi-solid or liquid soymilk preparation may be dispensed into a container having an appropriate volume and shape and subsequently frozen. In view of workability at the time of freezing, it is preferable to use a soymilk preparation having a shape retention property at room temperature.

The cheese snack-like food produced by the above operation has flavor and texture similar to those of a freeze-dried product of cheese and has long storage stability.

EXAMPLES

Hereinafter, the present invention will be explained by describing examples. All numerical values in the description are expressed in parts by weight.

Example 1

To 30 parts of commercially available low-fat soymilk (available from Fuji Oil Co., Ltd., BIMITOUNYU, solid content 10%, protein 4.4%, lipid 0.8%). 25 parts of coconut oil. 1.5 parts of common salt, and 10 parts of water were mixed and the mixture was heated to 50° C. To this heated mixture. 25 parts of pea starch. 5 parts of maltodextrin (available from Matsutani Chemical Industry Co., Ltd., PINEDEX #2), and 3.5 parts of a seasoning material were mixed, the mixture was heated and stirred at 50° C., and then pH was adjusted to 5.2 using lactic acid. This preparation was homogenized using a homogenizer, heat-sterilized at 80 to 90° C. by passing through a scraped surface continuous heat exchanger, and cooled to obtain a soymilk preparation.

This soymilk preparation had a shape retention property at room temperature, and thus, it was cut into a cube having a side of 1 cm and then freeze-dried to yield a freeze-dried product as a cheese-like snack food.

Example 2

To 30 parts of the low-fat soymilk used in Example 1, 25 parts of coconut oil, 1.5 parts of common salt, and 10 parts of water were mixed and the mixture was heated to 50° C. To this heated mixture, 25 parts of pea starch, 5 parts of maltodextrin, and 3.5 parts of a seasoning material were mixed, the mixture was heated and stirred at 50° C., and then heat-sterilized at 80 to 90° C. by passing through a scraped surface continuous heat exchanger. To the heat-sterilized product, 0.01% of a *Lactobacillus* starter obtained by mixing *Lactobacillus bulgaricus* and *Streptococcus thermophilus* was added and the resultant product was fermented at 37 to 40° C. for about 5 hours to pH of 5.2 to yield a soymilk preparation. Thereafter, processing was performed in the same manner as in Example 1 to obtain a freeze-dried product.

Example 3

A commercially available processed soymilk product (available from Fuji Oil Co., Ltd., MAMEMAJU semi-hard) (containing soymilk, vegetable oil and fat, and starch, water 43%, lipid 25%, protein 2%, starch 25%, pH 5.3) was cut into a cube having a side of 1 cm, and freeze-dried.

Comparative Example 1

Milk was used in place of soymilk to prepare a freeze-dried product in the same manner as in Example 1.

Evaluation

For the Examples and Comparative Example described above, flavor was checked immediately after freeze-drying and after being left open at room temperature for 7 days and 14 days. The evaluation was conducted by consultation of five panelists using the following criteria. ◎: There is no problem on flavor. ○: There is a slight unusual odor. Δ: There is a little unusual odor. x: There is an unusual odor and it is hard to eat.

TABLE 1

| | Immediately after | 7 days after | 14 days after | Features |
|---|---|---|---|---|
| Example 1 | ◎ | ◎ | ○ | At first, it was good and comparable to milk. Subsequent flavor change was also less. |
| Example 2 | ◎ | ◎ | ○ | The flavor was slightly weaker than that of Example 1. Flavor change was less. |
| Example 3 | ◎ | ◎ | ○ | At first, it was good and comparable to milk. Subsequent flavor change was also less. |
| Comparative Example 1 | ◎ | Δ | X | Lower fatty acid odor increased during storage. Thereafter, flavor further deteriorated. |

All of them exhibited a good cheese-like flavor. Examples 1 and 3 with fermentation had particularly good flavor. In any of the cheese-like snacks prepared using the soymilk in Examples 1 to 3 as a raw material, a large change in flavor was not observed even after storage for 1 to 2 weeks. On the other hand, the cheese-like snack prepared using the milk in Comparative Example 1 was initially accompanied by an odor believed to be derived from oxidation and a lower fatty acid, and thereafter accompanied by a strong unusual odor whose origin could not be identified.

INDUSTRIAL APPLICABILITY

According to the present invention, it is possible to supply a cheese-like snack food at a low cost while imparting storage stability to the cheese-like snack food.

The invention claimed is:

1. A method for producing a cheese-like snack food, the method comprising freeze-drying a soymilk preparation prepared by adding a fat and a starch to a soymilk, and the soymilk preparation having a pH of 6 or lower, wherein
   the soymilk preparation has a starch content of 15 wt. % or greater and 40 wt. % or less,
   the soymilk preparation has a water content of 20 wt. % or greater and 50 wt. % or less.

2. The production method according to claim 1, wherein the soymilk preparation has an oil content of 15 wt. % or greater and 45 wt. % or less.

3. The production method according to claim 1, wherein the soymilk is low-oil-content soymilk having an oil content of 2 wt. % or less.

4. The production method according to claim 1, wherein the soymilk is low-oil-content soymilk having an oil content of 2 wt. % or less.

5. The production method according to claim 1, wherein the pH is adjusted by fermentation.

6. The production method according to claim 1, wherein the pH is adjusted by fermentation.

\* \* \* \* \*